United States Patent
Taniguchi et al.

(10) Patent No.: US 7,270,204 B2
(45) Date of Patent: Sep. 18, 2007

(54) ELECTRICALLY MOTORIZED WHEEL WITH PROTECTIVE COVER

(75) Inventors: Makoto Taniguchi, Oobu (JP); Takuzou Mukai, Handa (JP)

(73) Assignee: Denso Corporation, Kariya (JP)

( * ) Notice: Subject to any disclaimer, the term of this patent is extended or adjusted under 35 U.S.C. 154(b) by 15 days.

(21) Appl. No.: 11/312,399

(22) Filed: Dec. 21, 2005

(65) Prior Publication Data

US 2006/0137926 A1  Jun. 29, 2006

(30) Foreign Application Priority Data

Dec. 28, 2004 (JP) ............................ 2004-380028

(51) Int. Cl.
*B60K 1/00* (2006.01)
(52) U.S. Cl. ...................... 180/65.5; 301/6.5
(58) Field of Classification Search ............... 180/65.5, 180/65.1; 301/6.5, 6.1
See application file for complete search history.

(56) References Cited

U.S. PATENT DOCUMENTS

| | | | | |
|---|---|---|---|---|
| 3,161,249 A | * | 12/1964 | Zuppiger et al. | 180/10 |
| 3,792,742 A | * | 2/1974 | Mager | 180/65.5 |
| 3,812,928 A | * | 5/1974 | Rockwell et al. | 180/65.5 |
| 3,892,300 A | * | 7/1975 | Hapeman et al. | 180/65.5 |
| 5,163,528 A | * | 11/1992 | Kawamoto et al. | 180/65.5 |
| 5,180,180 A | * | 1/1993 | Yamashita et al. | 180/253 |
| 5,289,905 A | * | 3/1994 | Braschler | 188/296 |
| 5,412,269 A | * | 5/1995 | Couture | 310/67 R |
| 5,438,228 A | * | 8/1995 | Couture et al. | 310/67 R |
| 5,633,544 A | * | 5/1997 | Toida et al. | 310/67 R |
| 5,691,584 A | * | 11/1997 | Toida et al. | 310/67 R |
| 6,148,940 A | * | 11/2000 | Hokanson et al. | 180/65.5 |
| 6,328,123 B1 | * | 12/2001 | Niemann et al. | 180/65.5 |
| 6,540,632 B1 | * | 4/2003 | Wendl et al. | 475/5 |
| 6,651,762 B1 | * | 11/2003 | Hokanson et al. | 180/65.5 |
| 7,121,367 B2 | * | 10/2006 | Ajiro et al. | 180/65.5 |

FOREIGN PATENT DOCUMENTS

| | | |
|---|---|---|
| JP | B2 3333488 | 7/2002 |
| JP | A 2004-90822 | 3/2004 |

\* cited by examiner

*Primary Examiner*—Jeff Restifo
(74) *Attorney, Agent, or Firm*—Oliff & Berridge, PLC

(57) ABSTRACT

An electrically motorized wheel assembly is provided which may be used in automotive vehicles. The wheel assembly is equipped with at least one electric motor having an output shaft located eccentrically from an axle of a wheel. The wheel assembly includes a protective cover which closes an opening of the wheel to define a substantially enclosed inner chamber within which a belt-driven torque transmission mechanism is disposed to protect it from foreign objects.

15 Claims, 6 Drawing Sheets

ELECTRICALLY MOTORIZED WHEEL WITH PROTECTIVE COVER

CROSS REFERENCE TO RELATED DOCUMENT

The present application claims the benefit of Japanese Patent Application No. 2004-380028 filed on Dec. 28, 2004, the disclosure of which is incorporated herein by reference into this application.

BACKGROUND OF THE INVENTION

1. Technical Field of the Invention

The present invention relates generally to an electrically motorized wheel assembly in which an electric motor is located eccentrically from an axle of a wheel for use in, for example, automotive vehicles, electrically-powered chairs, or electrically-powered carriers of robots, and more particularly to such an electrically motorized wheel assembly equipped with a protective cover.

2. Background Art

There are known electrically-powered carriers such as electric vehicles equipped with at least one pair of right and left motorized wheels each of which is driven by an electric motor. Motorized wheels of this type have the advantage that a differential gear or a long axle is not needed, thereby resulting in decreases in total weight of the carrier and inertia mass of rotating parts or a simplified structure of the carrier as compared with carriers in which a single electric motor is used to drive a pair of right and left wheels.

Japanese Patent First Publication No. 2004-90822 teaches an eccentric motor layout motorized wheel in which an output shaft of an electric motor is located eccentrically from an axle of the wheel. This structure has the advantage of increasing the degree of freedom of layout of the electric motor.

The eccentric motor layout motorized wheel requires the need for installation of a gear mechanism therewithin in order to transmit torque from the motor to the axle. In the case of use in automotive vehicles, the motorized wheel is sometimes placed in severe environments such as dust or muddy water conditions, which leads to a greater concern about an increase in wear of the parts, loss of torque transmission, or mechanical noise.

The above problem usually underlies all types of motorized wheels, but however, the eccentric motor layout motorized wheel has the output shaft of the motor not located coaxially with the axle and, thus, encounters a difficulty in protecting the gear mechanism from dust without mechanical interference with the motor and the axle. Of course, it is also difficult to employ a large-sized, complex sealing mechanism or a high-friction sealing mechanism.

SUMMARY OF THE INVENTION

It is therefore a principal object of the invention to avoid the disadvantages of the prior art.

It is another object of the invention to provide a simple structure of an electrically motorized wheel assembly designed to protect a torque transmission mechanism installed within a wheel from foreign objects.

According to one aspect of the invention, there is provided an electrically motorized wheel assembly which may be employed in automotive vehicles, electrically-powered chairs, or electrically-powered carriers of robots. The motorized wheel assembly comprises: (a) an axle support designed to be joined to a body of a carrier to be equipped with the wheel assembly; (b) an axle supported rotatably by the axle support, the axle extending from the axle support in an axial direction thereof; (c) a wheel mounted on the axle to be allowed to revolve on the axle, the wheel being made up of a hollow cylindrical wall and a center wall extending from an inner peripheral surface of the cylindrical wall inward to form an inner chamber which has an opening oriented toward the body of the carrier; (d) a motor secured to the axle support to have an output shaft from which torque is outputted, the output shaft extending eccentrically from the axle and having a head extending into the inner chamber of the wheel close to the inner peripheral surface of the cylindrical wall of the wheel in substantially parallel to the axle; (e) a torque transmission mechanism working to increase the torque, as produced by the motor, and transmit it to the wheel, the torque transmission mechanism being disposed in the inner chamber of the wheel; and (f) a protective cover including a central hole through which the axle passes, an outer peripheral portion, and a motor mount. The outer peripheral portion extends inside the wheel through a gap between an outer circumference thereof and the inner peripheral surface of the cylindrical wall of the wheel. The motor mount has thereon the motor to have the head thereof extending inside the inner chamber of the wheel. The protective cover is retained by the axle support and extending in a radial direction of the wheel to substantially close the opening of the inner chamber of the wheel to hermetically enclose the torque transmission mechanism within the inner chamber, thereby protecting the torque transmission mechanism from foreign objects. This ensures the effectiveness of the torque transmission mechanism and minimizing mechanical noises therefrom.

In the preferred mode of the invention, the motorized wheel assembly further comprises an air inlet mechanism which includes an air duct which has an air inlet oriented in a given direction. The air duct is designed to direct air entering at the air inlet into the inner chamber of the wheel. The air inlet mechanism is secured to the axle support.

The gap between the outer circumference of the protective cover and the inner peripheral surface of the cylindrical wall of the wheel serves as an air outlet from which the air is to be discharged from the inner chamber of the wheel.

The motor may include an air inlet opening outside the inner chamber of the wheel, an air outlet opening inside the inner chamber of the wheel, and a fan working to direct air entering at the air inlet to the air outlet.

The motor may alternatively include an air inlet opening into the inner chamber of the wheel, an air outlet opening outside the inner chamber of the wheel, and a fan working to transport air, which has entered at the air inlet and cooled an inside of the inner chamber, to the air outlet.

The air inlet of the air inlet mechanism may be designed to open frontward of the body of the carrier.

The air inlet mechanism may also include an air cleaner disposed in the air duct.

The inlet mechanism may be formed integrally with the protective cover made of resin.

The air inlet mechanism may include, as the air duct, a hole of a trailing arm which is made of a steel pipe and to which the axle support is joined.

The protective cover may is retained by a trailing arm to which the axle support is joined.

The outer peripheral portion of the protective cover may be made of a cylindrical wall facing the inner peripheral surface of the cylindrical wall of the wheel.

The torque transmission mechanism may include a rotor jointed to the axle support, one of a driven sprocket and a driven pulley, one of a driving sprocket and a driving pulley, and a transmission belt hung between the one of the driven sprocket and the driven pulley and the one of the driving sprocket and the driving pulley. The one of the driving sprocket and the driving pulley are mounted on the head of the output shaft of the motor. The one of the driven sprocket and the driven pulley and the one of the driving sprocket and the driving pulley are located on a plane which is so defined as to extend perpendicular to a line extending through the axle.

The rotor of the torque transmission mechanism may be implemented by a rotor of a brake unit installed in the inner chamber of the wheel.

The protective cover includes a cylindrical wall which extends substantially in the axial direction of the wheel to define the motor mount. The cylindrical wall is in close abutment with an peripheral wall of the motor to establish a seal therebetween.

The protective cover also serves as a motor support which secures the motor to the axle support.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
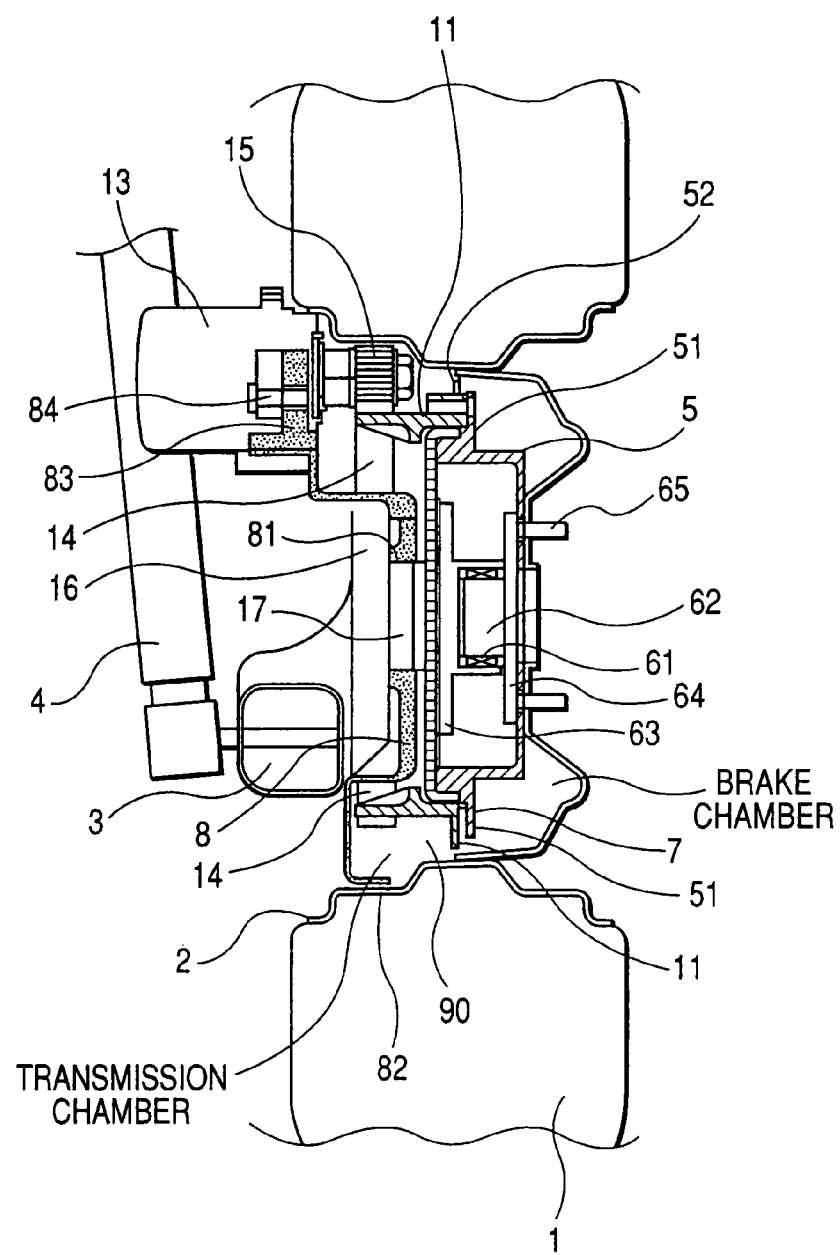
FIG. 1 is a sectional view which shows an internal structure of a motorized wheel assembly according to the invention.

Referring to the drawings, wherein like reference numbers refer to like parts in several views, particularly to FIGS. 1 and 2, there is shown an electrically motorized wheel assembly according to the invention which will be discussed here as being used, as an example, in an automotive vehicle. The motorized wheel assembly may also be used in electrically-powered chairs or electrically-powered carriers for robots.

The motorized wheel assembly includes, like a standard automotive wheel, of a tire 1, a wheel 2, a trailing arm 3, a damper (shock absorber) 4, a brake drum 5, and axle bearing unit 6. The damper 4 is retained by a body of the vehicle and has a lower end by which the trailing arm 3 is retained. The trailing arm 3 is joined at an outside of front end thereof to the wheel 2 in which the brake drum 5 is built. The axle bearing unit 6 is installed within the brake drum 5. The tire 1 is mounted on the wheel 2. The tire 1, the wheel 2, the trailing arm 3, and the damper 4 are basically identical in structure with typical ones of the automobile, and explanation thereof in detail will be omitted here.

An axle support mechanism to support the wheel 2 and the brake drum 5 rotatably will be described below.

The axle bearing unit 6 includes a bearing 61, an axle 62, an axle mount 63, and a hub plate 64. The axle 62 is joined to the hub plate 64 located outward thereof. The axle 62 may be formed integrally with the hub plate 64. To the hub plate 64, disc portions of the brake drum 5 and the wheel 2 are joined firmly through hub bolts 65.

The axle mount 63 is made of a block with a flange. The block has a chamber within which the axle 62 is retained rotatably through the bearing 61. The axle mount 63 is located inward of the hub plate 64 and faces the hub plate 64 in an axial direction of the hub plate 64.

Figure 2:
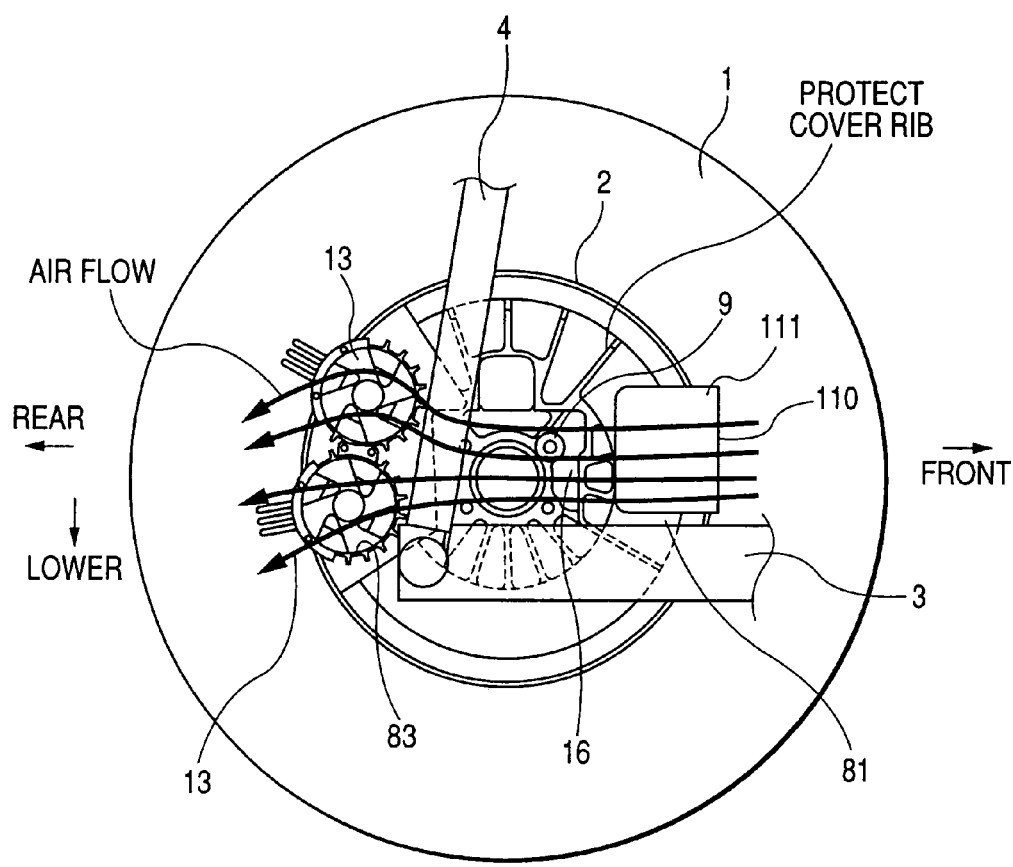
FIG. 2 is a plan view which shows a protective cover fitted in a wheel of the motorized wheel assembly of FIG. 1.

The axle mount 63 is secured to a support plate 16 through bolts 9, as illustrated in FIG. 2, together with a brake cover 7 and a protective cover 8. The support plate 16 is welded to the trailing arm 3 and extend vertically outside the trailing arm 3. The brake cover 7 is made of a disc which closes an opening of the brake drum 5.

The support plate 16 is located inward (i.e., the left side in FIG. 1) of the brake cover 7 through the protective cover 8 and has an axle support 17 secured to the center thereof. The axle support 17 protrudes outward of the support plate 16.

The axle support 17 passes through a center hole of the protective cover 8 and is placed in abutment with the brake cover 7. The brake cover 7 and the axle support 17 may be formed integrally as a unit.

The axle support 17 serves to support the axle 62 rotatably through the brake cover 7 and the axle mount 63 of the axle bearing unit 6.

The support plate 16, the axle support 17, and the brake cover 7 form the axle support mechanism which is secured to the trailing arm 3 and retains the axle mount 63 of the axle bearing unit 6. The axle support 17 has the smallest diameter in the axle support mechanism and works to establish a direct joint between the support plate 16 and the brake cover 7 without the protective cover 8. The axle support mechanism is joined by the lower portion of the damper 4 to the trailing arm 3 so that it is suspended from the vehicle body together with a coil spring (not shown).

The brake drum 5 is made of a bottomed hollow cylindrical member in which the axle bearing unit 6 is disposed and has a flange 51 extending radially from a circumferential wall thereof.

A cylindrical driven sprocket 11 is located inward of the brake drum 5 in the axial direction of the wheel 2 to be coaxial with the axle 62. The sprocket 11 has an outer end (i.e., the right end in the drawing) fitted in a step formed in an inner end of the flange 51 and joined thereto by bolts 52 located at angular intervals away from each other in a circumferential direction so that it may rotate in unison with the tire 1. Specifically, the sprocket 11 is secured to the outer peripheral surface of the brake drum 5 which is greater in diameter, thereby saving the weight of the sprocket 11.

Electric motors 13 are disposed close to an inward extending portion of a cylindrical peripheral wall of the wheel 2 and have output shafts extending in parallel to the axle 62 of the axle bearing unit 6. The motors 13 are preferably arrayed on a circle defined coaxially with the axle 62. Each of the motors 13 may be implemented by a motor-generator. Only one motor 13 or more than two motors 13 may alternatively be employed.

Figure 3A:
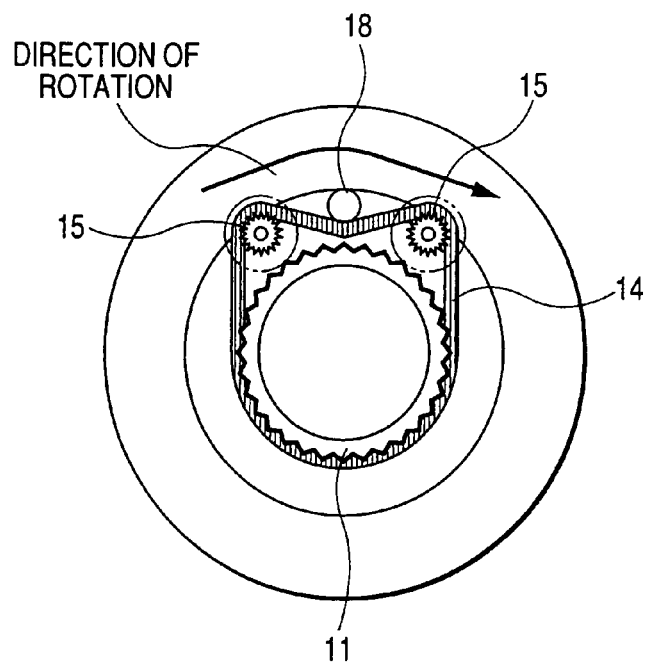
FIG. 3(a) is a schematic plan view which shows a layout of driving sprockets and a driven sprocket.
Figure 3B:
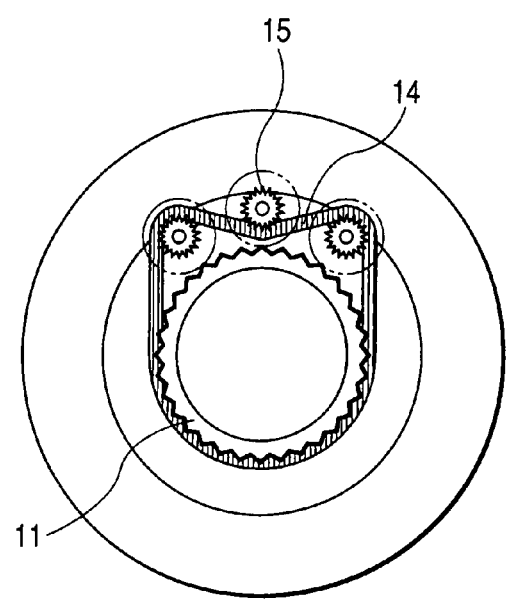
FIG. 3(b) is a schematic plan view which shows a layout of driving sprockets and a driven sprocket in a case where three motor are employed.

A driving sprocket 15 is fitted on a head of the output shaft of each of the motors 13 and, as illustrated in FIG. 3(a), coupled with the driven sprocket 11 through a cog-belt 14 for transmission of torque therebetween, A tension roller 18 is preferably disposed between the driving sprockets 15 of the motors 13. FIG. 3(b) illustrates for the case where three motors 15 are employed. A middle one of the driving sprockets 15 is disposed between other two and also used as a tension roller.

The motorized wheel assembly of this embodiment has the belt-driven torque transmission mechanism disposed within a torque transmission chamber of the wheel 2. The belt torque transmission mechanism works to increase the torque outputted from each of the motors 3 disposed eccentrically with the wheel 2 and transmit it to the brake drum 5. The belt torque transmission mechanism uses the cog-belt 14 which is rich in flexibility, thus alleviating the problems that muddy water or a foreign object caught between the cog-belt 14 and the sprocket 11 or 15 obstructs transmission of the torque or increases mechanical noise. This is because an area of the cog-belt 14 serving to transmit the torque, that is, a contact area between the cog-belt 14 and the sprocket 11 or 15 is greater than that in a typical gear torque transmission mechanism in which gears are in mesh with each other to transmit the torque.

The driven sprocket 11 is, as described above, located outward of the brake drum 5 and the axle support mechanism including the brake cover 7, etc., in the radius direction thereof and inward thereof in the axial direction thereof. The driving sprockets 15 fitted on the output shafts of the motors 15 and the driven sprocket 11 are, as can be seen from FIG. 1, located on a plane extending perpendicular to a center line extending through the center of the axle 61 of the wheel 2. In other words, the cog-belt 14 revolves in a direction perpendicular to the axis of the wheel 2. This ensures the stability of transmission of the torque without increasing the size of the wheel 2 in the axial direction and lengthening the output shaft of the motor 13 outward.

The protective cover 8 that is one of essential parts of the motorized wheel assembly in this embodiment and works to protect the belt-driven torque transmission mechanism within the wheel 2 from foreign objects will be described below.

Figure 4:
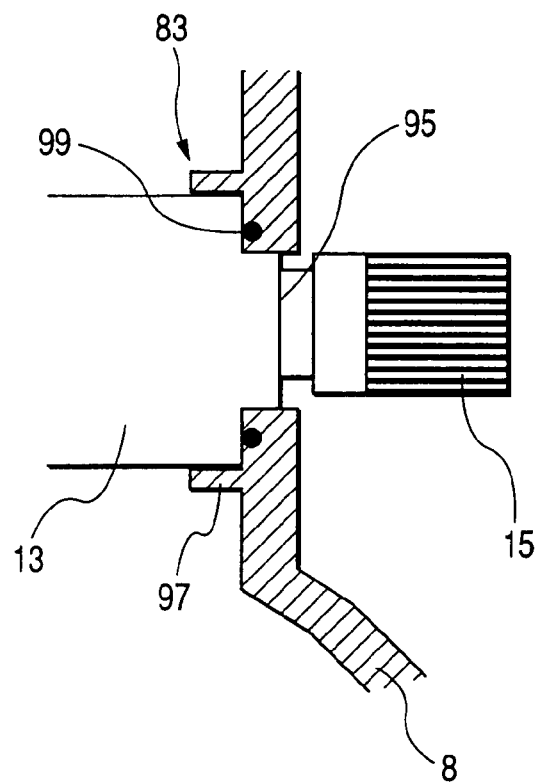
FIG. 4 is an enlarged sectional view which shows mounting of a motor to a protective cover.

The protective cover 8 is made of a resinous circular plate which closes an opening of the wheel 2 to define a hermetically closed chamber 90 in the wheel 2 within which the belt-driven torque transmission mechanism is installed. The protective cover 8 includes a center hole 81 through which the axle support 17 passes, a cylindrical outer peripheral portion 82, and cylindrical motor mounts 83. The peripheral portion 82 extends over the inner surface of the peripheral portion of the wheel 2. The motor mounts 83 are formed, as clearly shown in FIG. 2, in a peripheral portion of the protective cover 8. Each of the motor mounts 83 is, as clearly shown in FIG. 4, a cylindrical recess which is defined by a cylindrical wall 97 extending perpendicular to the plane of the protective cover 8 (i.e., the axial direction of the wheel 2). Each of the motor mounts 83 has formed in the bottom thereof a hole 95 through which the output shaft of the motor 13 extends into the inner chamber 90 of the wheel 2. Each of the motors 13 is close fitted at a peripheral wall thereof to inner periphery of the cylindrical wall 97, thereby sealing the hole 95. An O-ring 99 is preferably disposed between the protective cover 8 and the each of the motor 13 to create a hermetical seal therebetween. The firm joint of each of the motors 13 to the protective cover 8 is, as illustrated in FIG. 1, achieved by coupling a mount plate or tab extending from the periphery of the motor 13 in the radial direction thereof to one of the motor mounts 83 using bolts 84. The protective cover 8, as illustrated in FIGS. 1 and 2, has an upper portion which is located as above the axis of the wheel 2 as possible and bulges inward of the vehicle (i.e., the left in FIG. 1) to cover the driving sprocket 15. A lower portion of the protective cover 8 may be so shaped as to cover the driven sprocket 11.

The center hole 81 of the protective cover 8 is in close contact with the outer periphery of the axle support 17. The inner chamber 90 of the wheel 2, thus, communicates with the outside only through an air gap between the inner wall of the periphery of the wheel 2 and the outer peripheral portion 82 of the protective cover 8. Specifically, the protective cover 8 hermetically closes most of the inner chamber 90 of the wheel 8 without sacrificing rotation of the wheel 2. The inner wall of the periphery of the wheel 2 may alternatively be designed to establish engagement with the outer peripheral portion 82 of the protective cover 8 through a labyrinth seal. The center hole 81 may alternatively be in abutment with the axle support 17 through any known sealing member. The protective cover 8 may be formed integrally with the axle support 17. The protective cover 8 serves to protect the belt-driven torque transmission mechanism disposed inside the wheel 2 from foreign objects without causing heat to be produced by friction between the protective cover 8 and the wheel 2, thereby ensuring the effectiveness of the belt driven torque transmission mechanism and minimizing mechanical noises.

Figure 5:
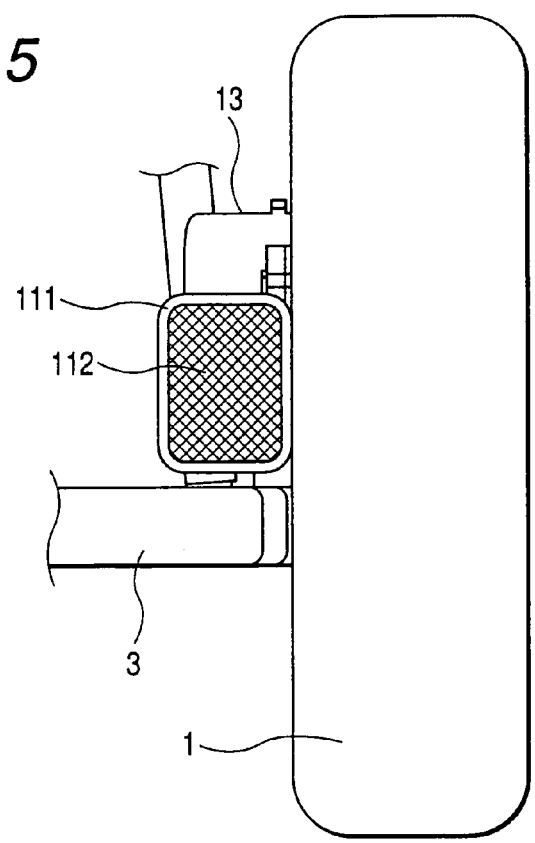
FIG. 5 is a front view which shows an air inlet mechanism installed in the motorized wheel assembly of FIG. 1.

An air inlet mechanism will be described below with reference to FIGS. 2 and 5.

The air inlet mechanism is made of a resinous duct 111 with an air inlet 110 oriented frontward of the vehicle. The duct 111 is designed to direct the air entering at the air inlet 110 to the inner chamber 90 of the wheel 2. The duct 111 is formed integrally with the protective cover 8. The duct 111 also has an air cleaner or filter 112 disposed detachably just downstream of the air inlet 110.

Each of the motors 13 is typically equipped with a cooling fan secured to a rotor therewithin. Each of the motors 13 typically has a motor housing with an air inlet and an air outlet The air inlet is formed in a front end of the motor housing and opens to the wheel 2. The air outlet is formed in a rear end of the motor housing and opens outside the inner chamber of the wheel 2. The air entering the each of the motors 13 at the front end thereof is discharged from the rear end of the motor 13.

When the fan of each of the motors 13 rotates, it causes the air within the inner chamber of the wheel 2 to be suck into the motor 13 to cool the inside thereof and discharged outside the inner chamber of the wheel 2. A vacuum is produced in the inner chamber, thus causing the air to be sucked from outside the wheel 2 through the air gap between the inner wall of the periphery of the wheel 2 and the outer peripheral portion 82 of the protective cover 8. The air gap is small enough to block entrance of big foreign objects disturbing rotation of the belt-driven torque transmission mechanism within the wheel 2. Specifically, the cooling mechanism (i.e., the fan) installed in each of the motors 13 is used to create a cooling air flow within the inner chamber of the wheel 2, thus resulting in a simplified structure of the in-wheel chamber cooling mechanism and blowing brake dust out of the wheel 2. The air inlet 110 of the duct 111 is, as described above, oriented frontward of the vehicle, thus decreasing electric powder consumed in creating the cooling air flows.

Figure 6:
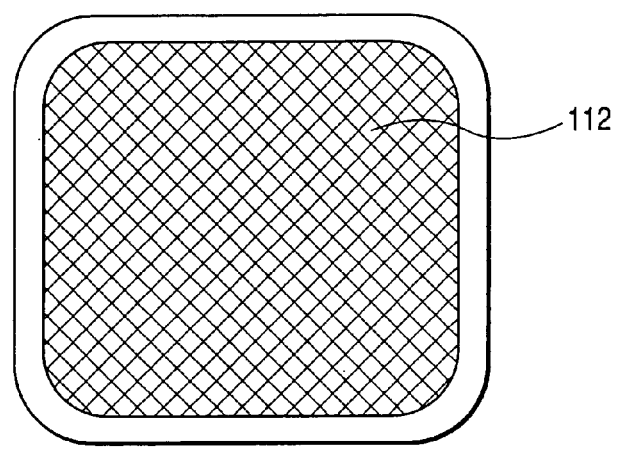
FIG. 6 is a plan view which shows an air filter fitted in the air inlet mechanism of FIG. 3.

The air filter 112, as can be seen FIG. 6, has a mesh. Instead of the air filter 112, a known cyclone separator working to separate foreign objects of a greater mass from an air flow or a know object separator designed to have a sharply curved air flow path to separate a foreign object of a greater mass from an air flow.

A flow of cooling air is, as described above, produced within the inner chamber of the wheel 2 by creating a vacuum in the inner chamber 90 using the fans of the motors 13. The air blown by the fan of each of the motors 13 may alternatively be directed into the inner chamber 90 of the wheel 2. This causes the air within the inner chamber 90 to be discharged outside the wheel 2 from the air gap between the inner wall of the wheel 2 and the outer circumference of the protective cover 8, thereby blocking entrance of foreign objects or liquid into the inner chamber 90. The flow of air into the inner chamber 90 of the wheel 2 may be created by a fraction of a flow of air produced by the fan of each of the motors 13 or a flow of air after having cooled the motors 13.

The trailing arm 3 made of a steel pipe to which the axle support mechanism is secured may be used instead of the air duct 111. Specifically, the trailing arm 3 is designed to have an air inlet and an air outlet leading into the inner chamber 90.

A plurality of motor-generators may be mounted on the protective cover 8 on a circle defined coaxially with the axle 62 at given angular intervals. The motor-generators work to operate selectively in a motor mode to drive the wheel 2 and in a regenerative braking mode to regenerate electric power. Instead of the driven sprocket 11, a driven pulley may be mounted on the flange 51 of the brake drum 5 that is a rotor of a brake unit. In this case, a driving pulley is mounted on each the motors 13. The circumference of the flange 51 of the brake drum 5 may be located close to the inner wall of the wheel 2 to define a substantially enclosed brake chamber outward within the inner chamber 90, thereby minimizing entrance of foreign objects into the brake chamber. The air within the inner chamber 90 of the wheel 2 may be sucked from an air inlet formed in a front end wall of each of the motors 13 exposed to the inner chamber 90 and discharged from an air outlet formed in a rear end wall of the motor 13 exposed outside the wheel 2. Use of this structure enables easy introduction of flesh air into each of the motors 13 to cool inside the motor 13 without the need for any ventilating guide. The duct 111 may be so mounted that the center of the air inlet 110 is located at a level higher than that of the axle 62 of the wheel 2. This minimizes entrance of foreign objects such as muddy water splashed by the tire into the air inlet 110.

Figure 7:
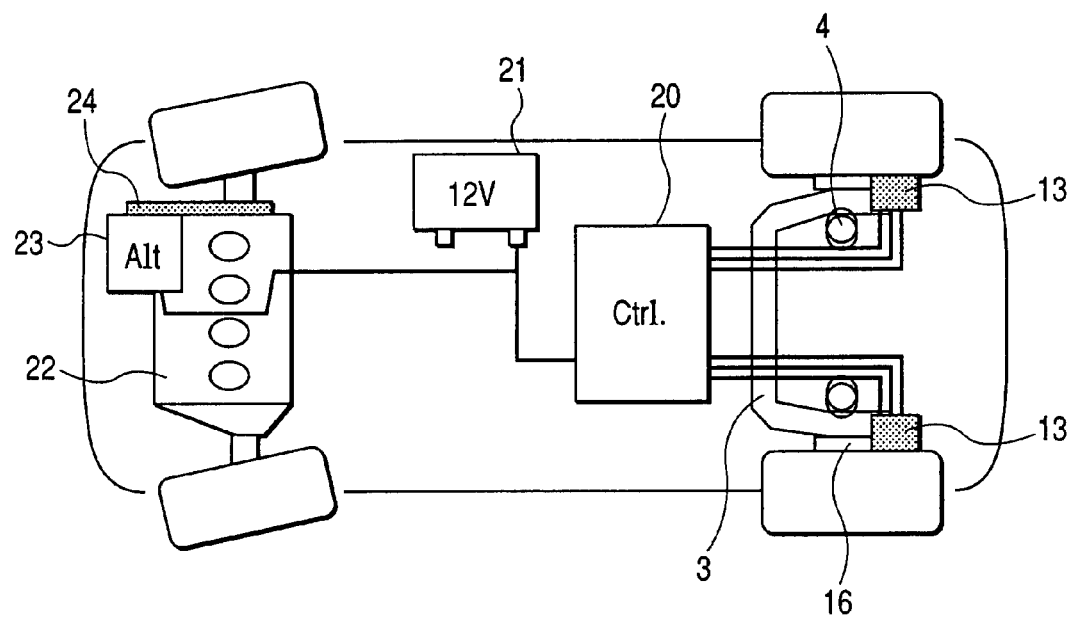
FIG. 7 is a schematic illustration which shows an automotive vehicle equipped with a pair of front right and left motorized wheel assemblies.

FIG. 7 shows an automotive vehicle (e.g., an electric vehicle) equipped with wheel assemblies each of which has the same structure as that of the one, as illustrated in FIG. 1.

The automotive vehicle has two front wheels and two rear wheels. The automotive vehicle has mounted therein an engine 22 (e.g., an internal combustion engine) which drives the front wheels. The rear wheels are implemented by the wheel assemblies with the motors 13. The automotive vehicle is also equipped with a controller 20 having built therein two inverters which are supplied with power from a storage battery 21 mounted on the vehicle to operate in the motor mode to control the motors 13. The battery 21 is charged by electric power generated by an alternator 23 driven by the engine 22 trough a belt 24. The motors 13 work to assist in rotating the wheel 2 when the vehicle starts and to operate in the regenerative mode to covert a decelerating or braking energy, as produced when the vehicle is decelerating or braking, into electrical energy to charge the battery 21.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An electrically motorized wheel assembly comprising:
    an axle support designed to be joined to a body of a carrier to be equipped with the wheel assembly;
    an axle supported rotatably by said axle support, the axle extending from said axle support in an axial direction thereof;
    a wheel mounted on said axle to be allowed to revolve on said axle, said wheel being made up of a hollow cylindrical wall and a center wall extending from an inner peripheral surface of the cylindrical wall inward to form an inner chamber which has an opening oriented toward the body of the carrier;
    a motor secured to the axle support to have an output shaft from which torque is outputted, the output shaft extending eccentrically from the axle and having a head extending into the inner chamber of said wheel close to the inner peripheral surface of the cylindrical wall of said wheel in substantially parallel to said axle;
    a torque transmission mechanism working to increase the torque, as produced by said motor, and transmit it to said wheel, said torque transmission mechanism being disposed in the inner chamber of said wheel; and
    a protective cover including a central hole through which said axle passes, an outer peripheral portion, and a motor mount, the outer peripheral portion extending inside said wheel through a gap between an outer circumference thereof and the inner peripheral surface of the cylindrical wall of said wheel, the motor mount having thereon said motor to have the head thereof extending inside the inner chamber of said wheel, said protective cover being retained by said axle support and extending in a radial direction of said wheel to substantially close the opening of the inner chamber of said wheel to hermetically enclose said torque transmission mechanism within the inner chamber.

2. An electrically motorized wheel assembly as set forth in claim 1, further comprising an air inlet mechanism including an air duct which has an air inlet oriented in a given direction, the air duct being designed to direct air entering at the air inlet into the inner chamber of said wheel, said air inlet mechanism being secured to the axle support.

3. An electrically motorized wheel assembly as set forth in claim 2, wherein the gap between the outer circumference of said protective cover and the inner peripheral surface of the cylindrical wall of said wheel serves as an air outlet from which the air is to be discharged from the inner chamber of said wheel.

4. An electrically motorized wheel assembly as set forth in claim 3, wherein said motor includes an air inlet opening outside the inner chamber of said wheel, an air outlet opening inside the inner chamber of the wheel, and a fan working to direct air entering at the air inlet to the air outlet.

5. An electrically motorized wheel assembly as set forth in claim 2, wherein said motor includes an air inlet opening into the inner chamber of said wheel, an air outlet opening outside the inner chamber of the wheel, and a fan working to transport air, which has entered at the air inlet and cooled an inside of the inner chamber, to the air outlet.

6. An electrically motorized wheel assembly as set forth in claim 2, wherein the air inlet of said air inlet mechanism is designed to open frontward of the body of the carrier.

7. An electrically motorized wheel assembly as set forth in claim 2, wherein said air inlet mechanism also includes an air cleaner disposed in the air duct.

8. An electrically motorized wheel assembly as set forth in claim 2, wherein said air inlet mechanism is formed integrally with said protective cover made of resin.

9. An electrically motorized wheel assembly as set forth in claim 1, wherein said air inlet mechanism includes, as the air duct, a hole of a trailing arm which is made of a steel pipe and to which the axle support is joined.

10. An electrically motorized wheel assembly as set forth in claim 1, wherein said protective cover is retained by a trailing arm to which said axle support is joined.

11. An electrically motorized wheel assembly as set forth in claim 1, wherein the outer peripheral portion of said protective cover is made of a cylindrical wall facing the inner peripheral surface of the cylindrical wall of said wheel.

12. An electrically motorized wheel assembly as set forth in claim 1, wherein said torque transmission mechanism includes a rotor jointed to said axle support, one of a driven sprocket and a driven pulley, one of a driving sprocket and a driving pulley, and a transmission belt hung between the one of the driven sprocket and the driven pulley and the one of the driving sprocket and the driving pulley, the one of the driving sprocket and the driving pulley being mounted on the head of the output shaft of said motor, the one of the driven sprocket and the driven pulley and the one of the driving sprocket and the driving pulley being located on a plane which is so defined as to extend perpendicular to a line extending through said axle.

13. An electrically motorized wheel assembly as set forth in claim as set forth in claim 12, wherein the rotor of said torque transmission mechanism is implemented by a rotor of a brake unit installed in the inner chamber of said wheel.

14. An electrically motorized wheel assembly as set forth in claim 1, wherein said protective cover includes a cylindrical wall which extends substantially in the axial direction of the wheel to define the motor mount, the cylindrical wall being in close abutment with an peripheral wall of said motor.

15. An electrically motorized wheel assembly as set forth in claim 1, wherein said protective cover also serves as a motor support which secures said motor to said axle support.

* * * * *